United States Patent [19]

Malaviya

[11] 3,914,749

[45] Oct. 21, 1975

[54] D.C. STABLE SINGLE DEVICE MEMORY CELL

[75] Inventor: Shashi Dhar Malaviya, Fishkill, N.Y.

[73] Assignee: International Business Machines Corporation, Armonk, N.Y.

[22] Filed: Dec. 23, 1974

[21] Appl. No.: 535,538

[52] U.S. Cl. .............................. 340/173 R; 357/58

[51] Int. Cl.$^2$ .............................. H01L 7/36

[58] Field of Search .................. 357/58, 34, 43, 36; 340/173 R

[56] References Cited

UNITED STATES PATENTS

| | | | |
|---|---|---|---|
| 3,717,515 | 2/1973 | Ashar et al. | 357/58 |
| 3,865,648 | 2/1975 | Castrucci et al. | 357/46 |

*Primary Examiner*—Vincent P. Canney

*Attorney, Agent, or Firm*—Thomas F. Galvin

[57] ABSTRACT

A single device, D.C. stable memory cell comprising a bistable bipolar transistor having a lightly-doped base and an emitter which is substantially coextensive with the base.

21 Claims, 9 Drawing Figures

D.C. STABLE SINGLE DEVICE MEMORY CELL

BACKGROUND OF THE INVENTION

1. Field of the Invention

This invention relates to integrated transistor circuits and particularly to the operating of transistors as memory elements.

2. Description of the Prior Art

Since the advantages of semiconductor random access memory arrays over magnetic storage devices became apparent a few years ago, considerable attention has been directed to providing simpler and more reliable devices. The typical semiconductor memory cell requires less power to operate and is much faster than magnetic devices.

Data storage systems utilizing insulated gate field effect and bipolar transistor circuits as storage elements are the predominant factors today. IGFET structures are less expensive to manufacture and can be packed more densely than bipolar circuits, but the latter are faster in operation. However, designers in the field realize that no semiconductor memory cell has yet achieved what may be termed as the "ideal" cell. For all practical purposes, an ideal semiconductor memory cell is one in which one bit of information may be stored in a single device for an indefinite period without the need for refreshing the cell. Such devices have been proposed in the literature but, to my knowledge, none have been successful.

The conventional random access memory cell, either FET or bipolar, comprises a flip-flop which utilizes a relatively large amount of surface area on a semiconductor chip. Each flip-flop requires from four to six devices to store a single bit of information. Such a device is D. C. stable in that it does not require the refreshing of the stored information for every cycle.

The alternative approach is to use dynamic type of random memory cell which requires from one to three transistors only but which, on the other hand, requires that the stored information be refreshed every cycle or every few cycles.

The devices just described, although far from perfect have been fabulously successful in the computer industry. However, the above-mentioned commercial need for the ideal device continues and has not, to my knowledge, been obtained heretofore.

SUMMARY OF THE INVENTION

Accordingly, the principal object of my invention is to produce a memory cell in which a single device may store a single bit of information and which is also D. C. stable.

It is a further object of my invention to fabricate such a device using a conventional semiconductor fabrication techniques which have been proven reliable and inexpensive in the semiconductor industry.

In accordance with these objects, I have designed a bipolar transistor which is capable of storing information, and which is also D. C. stable. I have achieved this goal by: (1) constraining the area of the intrinsic region of the base so that it is substantially coextensive with the emitter; and (2) by maintaining the doping level of the intrinsic base region so that the application of reverse bias potentials to the emitter and collector causes the region to be pinched off.

The geometrical restriction of the intrinsic base ensures that lateral conducting paths around the emitter are eliminated. The only electrical path between extrinsic base regions is under the emitter. If one of the extrinsic base regions is biased negatively with respect to the collector and emitter (for an NPN transistor), the other extrinsic base region tends to float when its conducting path through the intrinsic region to the negative potential has been pinched-off. Collector-to-base leakage current, $I_C$, then tends to aid potential of the floating extrinsic region, which in turn forward-biases the extrinsic base-emitter junction. The emitter is then sustained at the high potential, even after the source of the emitter bias is removed, provided that the collector-to-base leakage current in the floating extrinsic region is sufficient to supply leakage current to the pinched-off base channel as well as the emitter leakage current. This emitter potential may be detected as the "up" level of the cell.

By applying a bias potential to the emitter which is substantially equal to that of the biased (grounded) extrinsic base, the effective width $W_b$ of the intrinsic base region becomes large as a result of shrinkage of the depletion region, allowing the collector current $I_{CO}$ to drain through the intrinsic base region to ground at the biased extrinsic base region. There is thus no tendency for the emitter to become positive and the emitter is, therefore, also D. C. stable at this "down" level.

In the preferred embodiment of the cell, the length of the emitter is substantially greater than its width to ensure an adequate difference between up and down voltage levels.

DESCRIPTION OF THE PREFERRED EMBODIMENT

Figure 1:
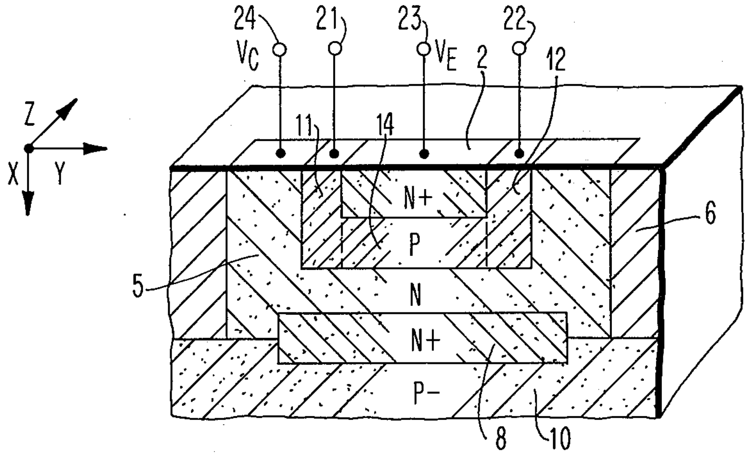
FIG. 1 is a cross-sectional, perspective view of the transistor of the present invention.

The transistor of FIG. 1 comprises an N+ emitter 2, N type collector 5, and subcollector 8 formed in a P type substrate 10. The base region is P type and for illustrative purposee is divided into sections 11, 12 and 14. Sections 11 and 12 are termed extrinsic base regions and section 14 below emitter 2 is termed an intrinsic base region. The emitter, base, collector and subcollector regions of the transistor, which are the active regions of the device, are surrounded by an isolation region 6. Preferably, region 6 comprises a recessed oxide layer (ROI). Region 6, or portions of it, might also be empty, the ambient such as air thereby providing isolation. A highly doped isolation region could be used instead of the ROI; however, this is not as satisfactory in preventing leakage current. Subcollector region 8 is not required for satisfactory operation of the transistor as a memory cell; however, the well-known advantages of such a region in the standard bipolar transistor are also effective in my device.

Fabrication of the device is achieved using standard processing techniques. As illustrated in FIG. 1, the transistor is preferably of the planar type, with emitter, base and collector regions having surfaces at a major surface of the semiconductor substrate. The various regions may be formed either by diffusion or by ion implantation of the appropriate conductivity determining dopants, or a combination of diffusion steps and ion implantation steps, where one is more suitable than the other. At the present state of the art, exhaustive detail concerning the fabrication techniques are considered unnecessary. The formation of the transistor itself, including the steps required to achieve the novel aspects of the structure, is quite conventional. The technique for forming recessed oxide insulation 6, which provides isolation between the devices and which, in this invention, also serves to block possible leakage paths between regions of the same device, is also well known in the art. Moreover, it will be understood by semiconductor designers that the drawing is not to scale. The horizontal dimensions of the device in FIG. 1 are much larger with respect to the vertical dimensions than shown. Thus, e.g., the width of base region 14 from emitter-base junction to base-collector junction is greatly exaggerated in the drawing.

An operative device is completed by the attachment of suitable electrodes 23 and 24, which provide potentials to the emitter and collector, respectively, and electrodes 21 and 22 which provide a potentials to the extrinsic base regions 11 and 12, respectively.

As previously discussed in the Summary, the doping level of the intrinsic base region 14 must be low enough to allow the region to be completely pinched-off upon the application of appropriate reverse-bias potentials to collector 5 and emitter 2. As a general rule, the higher the doping level in the intrinsic base region, the higher must be the reverse bias potential values applied to electrodes 23 and 24 to ensure that the intrinsic base region 14 can be completely pinched-off. In the preferred embodiment, the base doping level is between $5 \times 10^{15}$ and $1 \times 10^{16}$ atoms/cm$^3$. Obviously, the collector voltage, $V_C$, must not be so high as to cause junction breakdown due to avalanche multiplication or punch-through. However, breakdown is not a problem because for typical base width and doping levels, $V_C$ may be up to 30 volts or so for silicon. A more extended analysis of this subject is given in the textbook by Sze entitled, Physics of Semiconductor Devices, John Wiley & Sons, 1969, Part 1, Section 5. Extrinsic base regions 11 and 12 may have a higher doping level to reduce a total base resistance and also to provide adequate ohmic contact between said regions and electodes 21 and 22.

Another critical design factor which descriminates the present transistor from the prior art is the geometrical interrelationship between emitter 2 and intrinsic base region 14. They are coextensive; i.e., in the Y-Z plane, the area of the intrinsic base region 14 is substantially equal to the area of emitter 2. In the standard doublediffused bipolar transistor, the emitter region is formed within the base region so that the base completely surrounds, and encompasses a larger area than, the emitter at the surface of the substrate. This is by far the most practical approach for fabrication and it has not caused any particular problems with the operation of the resulting prior art devices. However, in my inventive device it is important that there be no leakage paths from emitter region 2 through intrinsic base region 14 when said region is pinched-off. Therefore, region 14 is constrained by isolation region 6 to be substantially coextensive with emitter 2. At most, the extension of the intrinsic base from the emitter in the Z-direction may be around ½ the base width, Wb (X-direction) to ensure complete pinch-off.

In the preferred embodiment as illustrated in FIG. 1, isolation region 6 also constrains extrinsic base regions 11 and 12 in the Z-direction. This is desirable but not necessary for bistable operation.

The length, L, of the emitter in the Y-direction as compared to its width, T, in the Z-direction is also a significant criterion. As will be explained in greater detail, the ratio of L/T is a factor in establishing the difference between the up and down levels of the memory cell.

For a device having an intrinsic base doping of $5 \times 10^{15}$ atoms/cc and where the collector voltage, $V_c$, is arbitrarily held at twice the emitter voltage, $V_e$, the length L may be computed as follows:

1. $L = 15\,[T/P\,(W_B - .39 \times 10^{-4}\,\sqrt{V_e})]^{1/2}$ cm where P is the total leakage current per unit length injected in the depleted intrinsic base region from the reverse-biased collector and emitter junctions expressed in terms of amperes $\times 10^{-8}$/cm; and $W_B$ is the metallurical base-width in cm.

Thus, for example, if $T = W_B = 10^{-4}$ cm, and

2. $W_B > .39 \times 10^{-4}\,\sqrt{V_e}$, so that $V_e \leqslant 6.5$ volts, e.g., 2 volts. With a leakage current $P = 4 \times 10^{-8}$ Amps./cm.

3. $L = 5 \times 10^{-4}$ cm, and $L : T \cong 5 : 1$.

OPERATION OF THE CELL

Figure 2:
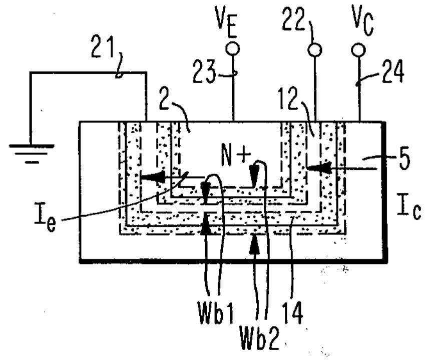
FIG. 2 is a model of the device in terms of a junction field effect transistor.

For ease of analysis, the bipolar structure can also be viewed as a junction gate FET with the two base contacts 21 and 22, acting as source and drain, emitter 2 acting as the junction gate, and the collector 5 as a back gate. In FIG. 2, the structure of FIG. 1 is redrawn to better explain the bistable operation. If an external voltage $+V_C$ is applied to collector 5 at contact 24, and a potential $+V_E$ is applied to emitter 2 at contact 23, with base contact 21 grounded and base contact 22 left floating, the width, $W_b$, of intrinsic base 14 is a function of $V_C$ and $V_E$. $W_{b2}$ is the initial base width including the emitter-base and collector-base depletion regions. Thus, for a given $V_C$, $W_{b2}$ decreases to $W_{b1}$ and if $V_E$ is made sufficiently positive so as to pitch off the base completely then $W_b = 0$; and the collector-to-base leakage current, $I_c$, is no longer able to return to ground potential at electrode 21. It therefore begins to charge up extrinsic base region 12 positively at a steady rate, assuming that the junction leakage current is practically independent of the reverse bias (which is generally true for large reverse biases). Meanwhile, a steady leakage current $I_e$ continues to flow from the reverse-biased emitter 2 to ground at electrode 21. When regions 12 rises to a potential $V_E + V_{be}$ above ground, the base-to-emitter junction around extrinsic region 12 becomes forward-biased; and leakage current begins to flow from base to emitter.

Now, the the potential $V_E$ is disconnected from emitter 2, allowing it to float, the emitter voltage will start rising if $I_c$ is greater than $I_e$. The P channel (intrinsic base 14) below the emitter now becomes pinched-off even harder; and the process continues until $I_e = I_c$ at some high positive emitter voltage.

This phenomenon occurs for the following reasons:

a. As the voltage in region 12 (and also $V_e$) increases, the reverse bias across the collector-extrinsic base 12 junction decreases. The leakage current $I_c$ therefore starts to drop, the drop becoming very rapid when the reverse bias decreases to below 1 volt.

b. As the emitter voltage becomes more positive, its leakage current $I_e$ tends to increase.

Emitter 2 can thus be held in its up state indefinitely, making the device bistable, if $I_c > I_e$ when the base is pinched off.

c. If emitter 2 is brought down to zero volt, the effective base width, $W_b$, becomes large. This allows $I_c$ to drain to ground so that electrode 22 is held close to zero volt and there is no tendency for the emitter to become positive. The down or zero state of the emitter is also, therefore, D. C. stable.

The magnitude of $I_c$ is larger than that of $I_e$ because the area of the junction of the collector-to-extrinsic base 12 is larger than the area of the junction of the emitter-to-extrinsic base 11.

CONDITIONS FOR D. C. STABILITY

Figure 3:
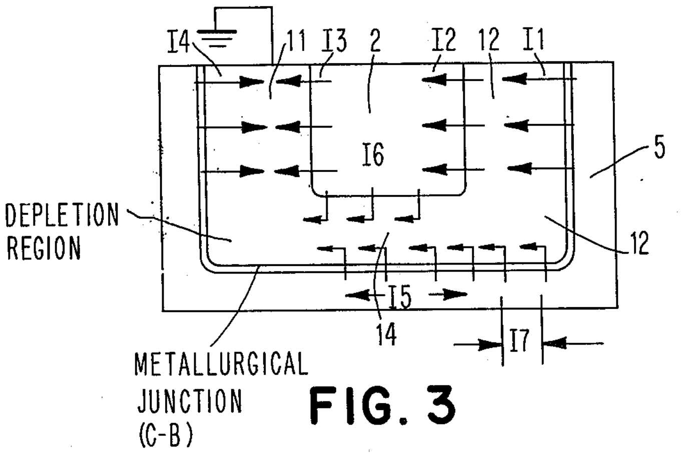
FIG. 3 illustrate the various currents through the transistor which must be compensated for to ensure stable operation.

The foregoing description of the operation of the cell can be better understood by analyzing the conditions of leakage current flow which are required for D. C. stability. The leakage currents are illustrated in FIG. 3 as follows:

- $I_1$ = leakage current from collector 5 to the extrinsic base region 12;
- $I_2$ = forward current from region 12 to emitter 2;
- $I_3$ = leakage current from emitter 2 to the extrinsic base region 11. It is proportional to the area of the emitter-to-extrinsic base 11 junction;
- $I_4$ = leakage current from collector 5 to region 11;
- $I_5$ = leakage current from collector 5 to the intrinsic base region 14 (pinched-off);
- $I_6$ = leakage current from emitter 2 to region 14;
- $I_7$ = leakage current from collector 5 through extrinsic region 12 and to region 14.

The magnitude of $I_1$ and $I_7$ is proportional to the area of the collector-to-extrinsic base junction.

In order to hold the emitter in its up state, it is necessary that the total leakage current $I_1$ must be greater than the total leakage current $I_3$. If other factors (such as the doping levels and reverse bias on the junctions) are the same, this implies that the area of the junction of the collector-to-extrinsic base 12 must be greater than the area of the junction of the emitter-to-extrinsic base 11. This is one of the necessary conditions for bistability.

Another necessary condition is that the total voltage drop across the pinched-off region 14 should be equal to $V_e + V_{be}$ with the given initial leakage current $I_7$ and the total leakage current $I_5 + I_6$ injected into region 14. The leakage from emitter 2 to the surrounding base region is negligible when the base voltage at electrode 21 is equal to or higher than $V_e$ but reaches almost its full value as soon as the base voltage falls to about ½ volt below $V_e$ in the pinched-off region 14.

NON-DESTRUCTIVE READ OUT OF THE CALL

My preferred method for reading information from the cell non-destructively, i.e., without altering the contents of the cell, is to probe the floating base region 12 via contact 22 (FIG. 1) with an external potential source through a series resistor in conjunction with a current monitor. The value of the potential source must be greater than or equal to the value of potential assumed by extrinsic base 12 at its up level. (The up level at emitter 2 plus one $V_{be}$. The value of the resistance must be sufficiently high that the external potential has negligible effect on the voltage of extrinsic base region 12 when at its down level. In the preferred embodiment, for example, the external potential would be around 3 volts and the value of the resistance around 10K – 20K ohms or more.

When the external potential source is applied to contact 22, if the stored information is at the up level, channel 14 remains pinched off and no current can flow from extrinsic region 12 to ground. However, if the stored information is at the down level, current will flow thorugh intrinsic region 14 to ground. Because the external potential source has little effect on the potential at extrinsic base region 12 whether the cell is in its up or down state, upon removal of the potential source from contact 22, the cell will remain in its original state. Various techniques for destructive or non-destructive read-out will occur to semiconductor memory designers based on obvious modifications of prior memory devices which are within the purview of my invention.

THEORETICAL ANALYSIS OF THE CELL

Figures 4, 5:
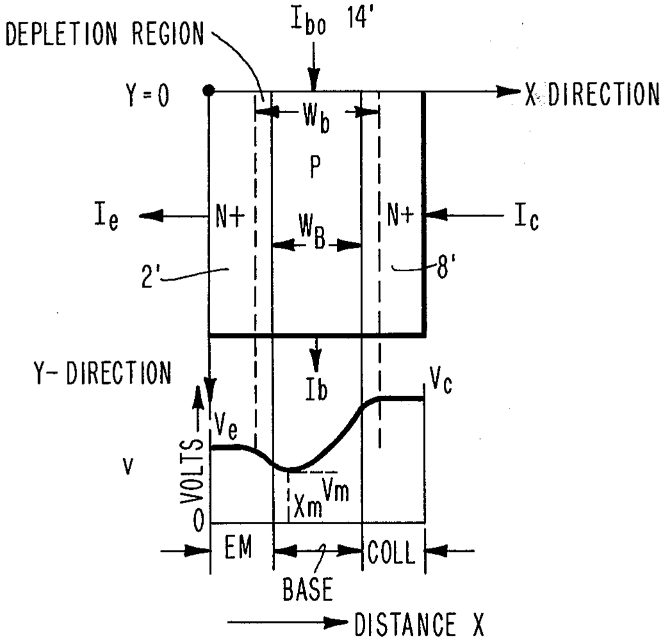
FIGS. 4 and 5 show a simple linear structure and the potential gradients, respectively, of my novel bipolar transistor having uniform base width.

FIG. 4 shows a simple linear structure of a N-P-N bipolar transistor with uniform metallurgical base width $W_B$. The device drawing is rotated by 90° to better relate it to the potential diagram of FIG. 5. With the collector and emitter held at sufficiently high positive (reverse-bias) voltages and the base fully depleted, as shown by the dashed lines, the potential gradient from the emitter to the collector follows the well-known contour illustrated in FIG. 5. The shape of the contour is determined by solving the basic device equations. It is assumed that the collector leakage current, $I_c$, is greater than the emitter leakage current, $I_e$, and the balance $(I_c - I_e)$ is drained away as base current, $I_b$. Also, it is assumed that a base current, $I_{bo}$, is injected into the base so that the total base current $I_b$ at the bottom is now given by:

4. $I_b = I_{bo} + I_c - I_e$

A potential minimum, $V_m$, exists at $X = X_m$ in the base. Any electron in the region between $X_m$ and the collector is accelerated towards the positively charged collector, and would end up there. Similarly, any electron found between $X_m$ and the emitter would be attracted towards the emitter. However, as is the case with forward-biased p-n junctions, if the base-emitter barrier $(V_e - V_m)$ is sufficiently reduced, some of the thermally generated electrons in the emitter overcome the barrier to reach beyond $X_m$, from which point they are swept away into the collector. This is the normal emitter-to-collector flow of electrons in conventional transistors, consituting the collector-to-emitter current, with the base slightly forwardbiased.

FIGS. 6 through 9 illustrate potential variations in the X-Z plane at selected locations along the intrinsic base region (Y direction) from the floating extrinsic region 12 to the grounded extrinsic region 11. Because the depletion widths in the emitter and collector are negligible compared to the width of the base depletion region, the former may be ignored and only the latter is shown in the figures. Thus, XO and XO′ represent the metallurgical emitter-base junction and XW and XW′ represent the collector-base junctions for intrinsic and extrinsic base regions respectively. The overall import of the figures is that the minimum base voltage $V_{M1}$ gradually decreases from a positive level nearest floating extrinsic base region 12 to ground at grounded extrinsic base region 11.

Figure 6:
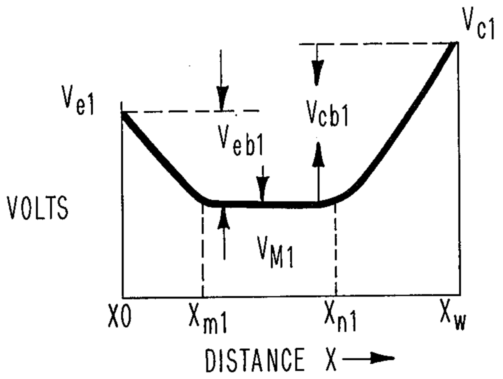
FIGS. 6–9 are potential energy diagrams at various points along the intrinsic base region.

In FIG. 6, which illustrates the X-Z plane nearest region 12, the potential minimum $V_{M1}$ is typically around +2 volts and is flat bottomed. This shape occurs because thermally generated holes in the vicinity of the collector are accelerated toward the potential minimum in the base, as are the holes in the vicinity of the emitter. The potential valley around $X_m$ (FIG. 4) therefore, starts to fill up with mobile positive charges (holes), causing its D. C. voltage to rise till a dynamic equilbrium is reached, with the valley filled with $X = X_{m1}$ to $X = c_{n1}$ with mobile charges. Any further increase in the height of the valley is stopped when $V_{eb}$ becomes small and the emitter-base junction tends to be forward-biased, thereby providing a path for spill over the excess holes. Another factor which can limit the final height of the valley is the leakage current $I_b$ and the 'pinched-off' base channel. Because very little current flows across the valley, there is negligible potential drop from $X_{n1}$ to $X_{ml}$ and the valley is therefore almost flat-bottomed. However, a slight increase in the height may be shown at $X_{n1}$ to account for the few picoamperes of leakage current which would normally flow across it.

The steep potential gradient from $X_{u'}$ to $X_{nl}$ imparts kinetic energy to the holes and enables some of them to surmount the additional potential barrier when they reach $X_{ml}$. However, its overall effect on device operation is negligible.

Figure 7:
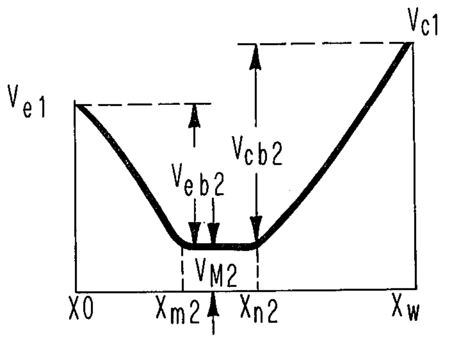
Figure 8:
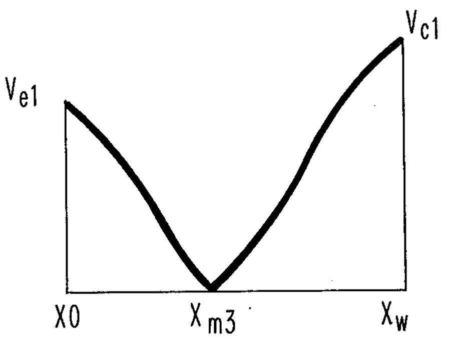
Figure 9:
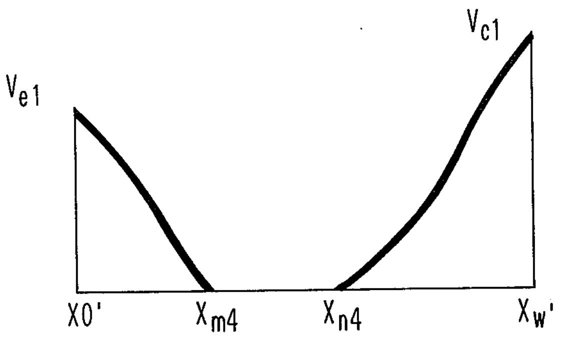

FIG. 7 shows the potential variation in an X-Z plane of region 14 which is further removed from floating region 12 than the plane of FIG. 6. FIG. 7 shows the effect of a drop in the potential of the valley from $V_{M1}$ to the value $V_{M2}$, typically 1 volt. The widening of the two potential gradient regions $X_0 - X_{m2}$ and $X_{n2} - X_{u'}$ is consistent with the increased voltage drops $V_{eb2}$ and $V_{cb2}$. FIG. 8 shows the limiting case where $V_m = 0$ in the intrinsic base region near extrinsic region 21. The potential at the bottom of the valley at $X = X_{m3}$ is now zero volt.

EMITTER LENGTH-TO-WIDTH RATIO

As the width of the base increases at the intersection of intrinsic region 14 and extrinsic region 11, a non-depleted zero volt region of width $X_{m4} - X_{n4}$ is created in the region where the base width has increased to $X_{0'} - X_{u'}$. All the holes generated within the base region whether in the region $X_{0'} - X_{m4}$ or in the region $X_{u'} - X_{n4}$ are accelerated toward and flow down the valley as the intrinsic base potential gradually drops from $V_{ml}$ near extrinsic region 12 to 0 volt near extrinsic region 11.

Even a weak electric field along the Y direction in the pinched-off region 14 of the base drains off the free holes and tends to prevent build-up of the potential, the potential being essential for bistability of the device. The portion of intrinsic base 14 near extrinsic region 11 in all cases has such a field; but the middle portion of region 14 can be made free of a field component by making the Y-dimension of emitter 2 large as compared to the Z-dimension. The flow of base current in the middle part of the emitter (free from end effects) would then be by diffusion only. The following analysis yields the criteria required for designing the proper length (L) to width (T) ratio of the emitter.

Referring again to FIGS. 4 and 5, if the base current in the depletion region (along the Y-direction) is $I_b$ (Y), it is related to the gradient of hole density by the equation:

$$(5)\quad \frac{I_b(Y)}{T\,W_b(Y)} = -q\,D_p \frac{dp(Y)}{dy} = q\mu_p\,E(Y)\,p(Y)$$

where:

$W_b$ (Y) is the variable width of the mobile charge region 14;

T is the thickness of the charge region (Z direction);

$D_p$ is the diffusion constant of the minority carriers;

$\mu$ p is the mobility of the minority carriers;

p (Y) is the density of excess minority carriers (holes); and

E (Y) is the electric field associated with the diffusion gradient.

The base current due to extrinsic region 12 constitutes an initial current, $I_{bo}$, for the pinched-off region 14; and $I_b$ increases further as more leakage current is injected into the pinched region by collector 5. Hence, for the upper part of the pinched-off region:

$$6.\ I_b(Y) = I_{bo} = K_1 Y$$

where $K_1$ is a constant. The width $W_b$ (Y) is related to the base voltage $V_m$ (Y) by the relation:

$$7.\ W_b(Y) = W_B - d_1(Y) - d_2(Y)$$

where:

$W_B$ is the metallurgical base width; and $d_1$ and $d_2$ are the widths of the depletion region in the base due to $V_{eb}$ and $V_{cb}$, respectively.

The voltage drop, $V_m(\mathbf{0}) - v_m(Y)$, associated with the diffusion current is evaluated by using equation (5) and the Einstein relation $D_p/\mu_p = KT/q$ which gives:

$$8.\ p(y) = p(\mathbf{0}) \exp(v/v' - V_o/v')$$

where:

$$v' \equiv KT/q;\ V \equiv v(Y);\ Vm(\mathbf{0}) \equiv V_o;$$

and p(0) is the density of holes in the upper region of the base at Y = 0.

Separation of variables and integration leads to:

$$(9)\quad \frac{(I_{bo} + K_1 L/2)\,L e^{V_o/v'}}{q\,D_p\,p(0)T} = W_B(e^{V_o/v'} - e^{V_L/v'}) - K_2 I$$

where:

$$10.\ I \equiv \sqrt{V_c}\,I_1 + \sqrt{V_c}\,I_2;$$

$$(11)\quad I_1 \equiv \int_{V_L}^{V_o} \left(1 - \frac{v}{V_c}\right)^{1/2} d(e^{v/v'}):$$

$$(12)\quad I_2 \equiv \int_{V_L}^{V_o} \left(1 - \frac{v}{V_c}\right)^{1/2} d(e^{v/v'})\text{: and}$$

$$13.\ V_L \equiv V_m(L)$$

Using only the first four terms of the series for $(1 - x)^{1/2}$ we obtain:

$$(14)\quad I_1 \cong \int_{V_L}^{V_o} \left(1 - \frac{1}{2}\frac{v}{V_e} - \frac{1}{8}\frac{v^2}{V_e^2} - \frac{1}{16}\frac{v^3}{V_e^3}\right) e^{v/v'}\, d\frac{(v)}{(v')}$$

$$(15)\quad I_1 \cong \int_{V_L}^{V_o} \left(1 - \frac{1}{2}\frac{v}{V_c} - \frac{1}{8}\frac{v^2}{V_c^2} - \frac{1}{16}\frac{v^3}{V_c^3}\right) e^{v/v'}\, d\frac{(v)}{(v')}$$

The integrations are carried out by using the general formula:

$$(16)\quad \int x^m \cdot e^{ax} \cdot dx = e^{ax} \sum_{r=o}^{m} (-1)^{\nu} \frac{m!\, x^{m-\nu}}{(m-\nu)!\, a^{\nu+1}}$$

which gives:

$$(17)\quad I_1 \cong (e^{V_o/v'} - e^{V_L/v'}) - \frac{1}{2V_e}\left[e^{v/v'}(v-v')\right]_{V_L}^{V_o}$$

$$\frac{-1}{8V_e^2}\left[e^{v/v'}(v^2 - 2vv' + 2v'^2)\right]_{V_L}^{V_o}$$

$$\frac{-1}{16V_e^3}\left[e^{v/v'}(v^3 - 3v^2v' + 6vv'^2 - 6v'^3)\right]_{V_L}^{V_o}$$

The equation for $I_2$ is the same except that $V_c$ is substituted for $V_e$.

I can then be evaluated from equation (10) for $V_L \rightarrow 0$, $v' \equiv kT/q \approx 0.026$ volt at room temperature, and $V_o >> v'$ as follows:

$$(18)\quad I \cong \left[\sqrt{V_e} + \sqrt{V_c} - \frac{V_o}{2}\left(\frac{1}{\sqrt{V_e}} + \frac{1}{\sqrt{V_c}}\right) - \frac{V_o^2}{8}\left(V_e^{\frac{-3}{2}} + V_c^{\frac{-3}{2}}\right) - \frac{V_o^3}{16}\left(V_e^{\frac{-5}{2}} + V_c^{\frac{-5}{2}}\right)\right] e^{V_o/v'}$$

The following assumptions can be made to simplify equation (18):

19. $V_o \approx V_e + V_{be}$

Also, it may safely be assumed that an up level of 50% of the collector voltage $V_c$ would generally be sufficient in practical designs so that:

20. $V_c \approx 2V_e$

Substituting (19) and (20) in (18) we obtain:

$$(21)\quad I \cong \sqrt{V_e}\left[2.41 - .853\left(1 + \frac{V_{be}}{V_e}\right) - .17\left(1 + \frac{V_{be}^2}{V_e}\right) - .073\left(1 + \frac{V_{be}^3}{V_e}\right)\right] e^{(V_{be} + V_e)/v'}$$

If $V_{be} << V_e$, equation (21) can be simplified to:

$$(22)\quad T \cong \sqrt{V_e}\left[1.32 - 1.41\frac{V_{be}}{V_e}\right] e^{(V_e + V_{be})/v'}$$

and equation 9. becomes:

$$(23)\quad \left(I_{bo} + \frac{K_1 L}{2}\right) L \approx A\left[W - K_2\sqrt{V_e}\left(1.32 - 1.41\frac{V_{be}}{V_e}\right)\right]$$

where:

$I_{bo}$ = initial base current at $y = o$;
$K_1$ = total leakage current into the base per unit length of the base;
$A \equiv 8 D_p T p(\mathbf{0})$;
$p(\mathbf{0})$ = Na for zero electric field in the valley, i.e., a flat-bottomed valley;
$L$ = length of the base; and
$W$ = width of the base;
$V_{be} \approx \mathbf{0.6}$ volt at room temperature; and $$K_2 = \sqrt{\frac{2\epsilon}{qNa(1 + Na/Nd)}} \approx \sqrt{\frac{2\epsilon}{qNa}} = 2.96 \times 10^{-5} \frac{\text{cm}}{\sqrt{\text{volt}}}$$

for Na = $\mathbf{5 \times 10^{15}}$ atoms/cc.

The relationship between the physical length of the emitter (in the central parallel region) and the up level $V_e$ of the emitter is thus given by equation (23) in terms of the other device constants on the assumptions that the collector voltage $V_c$ is maintained at the arbitrary value of twice the emitter voltage $V_e$ and that $V_e$ is much greater than $$\frac{kt}{q} \approx .026$$

volt.

Equations similar to (23) can be derived for other ratios of the collector to emitter voltage by correcting equation (20) to conform to said ratios and deriving equations (21) through (23) on that basis. Using the values:

$q = 1.6 \times 10^{-19}$ coulomb, $D_p \approx 14$ cm²/sec., and $p(\mathbf{0}) = Na = 5 \times 10^{15}$ atoms/cc, we obtain:

24. $A \approx 1.12$ T microamperes

If $I_{bo} = o$ and $K_1 = P$ picoamperes per micron length of the device ($= p \cdot 10^{-2}\mu$ A per cm), equation (20) reduces to:

$$(25)\quad \frac{PL^2}{224T} \approx W_b - 2.96 \times 10^{-5}\sqrt{V_e}\; 1.32 - 1.41\frac{V_{be}}{V_e}$$

or $$(26)\quad L \approx \frac{15\sqrt{T}}{\sqrt{P}}\left[W_b - .39 \times 10^{-4}\sqrt{V_e}\right]^{1/2}\text{cm.}$$

for $V_{be} << V_e$

Equation (26) is the same as equation (1) and gives the approximate length of the depletion region (Y -direction in the base which is needed to sustain the up level of the emitter at the voltage $V_e$ (volts), provided that the collector is held at $2V_e$.

While the invention has been particularly described with reference to the preferred embodiments thereof, it will be understood by those skilled in the art that the foregoing and other changes in form and details may be made therein without departing from the spirit and the scope of the invention. For example, the bipolar transistor has been described in terms of NPN device including an N+ subcollector region. However, it should be obvious that a PNP type bipolar transistor, with appropriate changes in potentials, will operate in the same fashion. In addition, as previously pointed out, the subcollector region, although preferred, is not necessary for satisfactory operation.

I claim:

1. A transistor memory cell comprising:
- an emitter, a base and a collector;
- said base including an intrinsic region and first and second extrinsic regions adjacent said intrinsic region;
- means for applying potentials to said emitter, collector and at least said first extrinsic region;
- said intrinsic region having an area which is substantially coextensive with said emitter, and having a relatively low doping level such that the application of reverse biases to said emitter and collector with respect to said base causes said intrinsic base region to be pinched off;
- whereby the potentials at said emitter and at second extrinsic base region may assume two stable levels indicative of two stable memory conditions.

2. A memory cell as in claim 1 further comprising:
- isolation means contiguous to the sides of said intrinsic region, thereby eliminating lateral conducting paths from said intrinsic region.

3. A memory cell as in claim 2 wherein said isolation means comprises silicon dioxide.

4. A memory cell as in claim 2 wherein said isolation means is also contiguous to the sides of said first and second extrinsic regions.

5. A memory cell as in claim 1 wherein the doping level of said intrinsic region is around $5 \times 10^{15}$ atoms/cm$^3$ to $1 \times 10^{16}$ atoms/cm$^3$.

6. A memory cell as in claim 5 wherein the ratio of the length of the emitter between extrinsic regions is around 5 times greater than the emitter width, thereby ensuring a substantial difference between said two stable potential levels of said memory cell.

7. A method for operating the transistor memory cell defined in claim 1 as a bistable device comprising the steps of:
- reverse-biasing said emitter and collector with respect to said base region, thereby causing said intrinsic base region to be pinched off and the potential in said second extrinsic base region to be raised;
- removing the source of said reverse-bias potential from said emitter, thereby raising the potential at said emitter to a first stable state indicative of a first stable memory condition; and
- applying a potential to said emitter which is below the level necessary to sustain said first stable state thereby lowering the potential at said emitter to a second stable memory condition.

8. A memory cell as in claim 1 further comprising:
- means for applying a potential to said second extrinsic region.

9. A method for non-destructively sensing said stable memory conditions in the memory cell defined in claim 8 comprising the steps of:
- applying a source of voltage through a series resistance to said potential-applying means of said second extrinsic region;
- the value of said voltage being at least equal to the higher value of potential which may exist at said second extrinsic base region;
- the value of said resistance being sufficiently high so as to prevent said voltage from affecting the lower value of potential which may exist at said second extrinsic base region; and
- monitoring the current which flows from said source of voltage through said second extrinsic base region, the presence or absence of significant current flow being indicative of said lower or higher value of potential, respectively.

10. A single device D.C.-stable memory cell comprising:
- a bipolar transistor of the planar type including an intrinsic base region below, and first and second extrinsic base regions adjacent to the sides of the emitter;
- the area of said intrinsic region being substantially coextensive with the area of said emitter;
- means for applying bias potentials to the emitter, collector and said first extrinsic base regions;
- said intrinsic base region having a relatively low doping level such that the application of reverse bias potentials to said emitter and collector with respect to said base region causes said intrinsic base region to be pinched off, whereby the potentials at said emitter and said second extrinsic base region may assume two stable levels indicative of two stable memory conditions.

11. A memory cell as in claim 10 further comprising:
- isolation means contiguous to the side of said intrinsic region, thereby eliminating lateral conducting paths from said intrinsic region.

12. A memory cell as in claim 11 wherein said isolation means comprises silicon dioxide.

13. A memory cell as in claim 11 wherein said isolation means is also contiguous to the sides of said first and second extrinsic regions.

14. A memory cell as in claim 10 wherein the doping level of said intrinsic region is around $5 \times 10^{15}$ atoms/cm$^3$ to $1 \times 10^{16}$ atoms/cm$^3$.

15. A memory cell as in claim 14 wherein the ratio of the length of the emitter between extrinsic regions is around 5 times greater than the emitter width, thereby ensuring a substantial difference between said two stable potential levels of said memory cell.

16. A method for operating the memory cell defined in claim 10 comprising the steps of:
- reverse-biasing the emitter and collector of said bipolar transistor with respect to said base region, thereby causing said intrinsic base region to be pinched off and the potential in said second extrinsic base region to be raised;
- removing the source of said reverse-bias potential from said emitter, thereby raising the potential at said emitter to a first stable state indicative of a first stable memory condition; and
- applying a potential to said emitter which is below the level necessary to sustain said first stable state, thereby lowering the potential at said emitter to a second stable memory condition.

17. A memory cell as in claim 10 further comprising: means for applying a potential to said second extrinsic region.

18. A method for non-destructively sensing said stable memory conditions in the memory cell defined in claim 17 comprising the steps of:

applying a source of voltage through a series resistance to said potential-applying means of said second extrinsic region;

the value of said voltage being at least equal to the higher value of potential which may exist at said second extrinsic base region;

the value of said resistance being sufficiently high so as to prevent said voltage from affecting the lower value of potential which may exist at said second extrinsic base region; and monitoring the current which flows from said source of voltage through said second extrinsic base region, the presence or absence of significant current flow being indicative of said lower or higher value of potential, respectively.

19. A single device, D.C. stable memory cell comprising:

a bipolar transistor of the planar type including an intrinsic base region below, and first and second extrinsic base regions adjacent to the sides of the emitter;

isolation means contiguous to the sides of said intrinsic base region and said emitter to substantially equalize the areas of said emitter and said intrinsic base region at their interface;

the length of the emitter between said extrinsic base regions being substantially greater than the width of said emitter;

means for applying bias potentials to the emitter, collector and said first extrinsic base regions;

said intrinsic base region having a relatively low doping level such that the application of reverse bias potentials to said emitter and collector with respect to said base region causes said intrinsic base region to be pinched off, whereby the potentials at said emitter and said second extrinsic base region may assume two stable levels indicative of two stable memory conditions.

20. A memory cell as in claim 19 wherein:

the doping level of said intrinsic region is around $5 \times 10^{15}$ atoms/$cm^3$ to $1 \times 10^{16}$ atoms/$cm^3$; and said emitter lenght-to-width ratio is around 5:1.

21. A memory cell as in claim 20 further comprising:

means for applying a voltage source to said second extrinsic base region whereby the contents of said cell may be sensed non-destructively.

* * * * *

UNITED STATES PATENT OFFICE
CERTIFICATE OF CORRECTION

PATENT NO. : 3,914,749

DATED : October 21, 1975

INVENTOR(S) : Shashi Dhar Malaviya

It is certified that error appears in the above-identified patent and that said Letters Patent are hereby corrected as shown below:

| | |
|---|---|
| Column 1, Line 38 | after "random" insert --access-- |
| Column 3, Line 29 | delete "a" after "provide" |
| Column 3, Line 60 | delete "doublediffused" and insert --double-diffused-- |
| Column 5, Line 61 | delete "CALL" and insert --CELL-- |
| Column 7, Line 14 | after "filled" delete "with" and insert --from-- |
| Column 7, Line 15 | delete "$X=c_{n1}$" and insert --$X=X_{n1}$-- |
| Column 8, Line 31 | delete "$I_b (Y) = I_{bo} = K_1 Y$" and insert --$I_b (Y) = I_{bo} + K_1 Y$-- |

UNITED STATES PATENT OFFICE
CERTIFICATE OF CORRECTION

PATENT NO. : 3,914,749
DATED : October 21, 1975
INVENTOR(S) : Shashi Dhar Malaviya It is certified that error appears in the above-identified patent and that said Letters Patent are hereby corrected as shown below:

Column 9, Line 34 delete "$e^{V}o/v$" and insert --$e^{V}o/v'$--

Column 9, Line 67 delete "9." and insert --(9)--

Column 10, Line 19 delete "$2.96^{cm} \times 10^{-5} \sqrt{volt}$" and insert --$2.96 \times 10^{-5}\ \frac{cm}{\sqrt{volt}}$--

Column 10, Line 57 insert --(-- before "1.32" and insert --)-- after "$\frac{V_{be}}{V_e}$"

Column 10, Line 59 delete "$10^4$" and insert --$10^{-4}$--

Signed and Sealed this

*tenth* Day of *February 1976*

[SEAL]

*Attest:*

RUTH C. MASON
*Attesting Officer*

C. MARSHALL DANN
*Commissioner of Patents and Trademarks*